3,454,618
PROCESS OF CHLORINATING CYCLOBUTANE-1,2-DICYANIDE AND RESULTING COMPOUNDS
Janice L. Greene, Warrensville Heights, and James D. Idol, Jr., and Norman W. Standish, Shaker Heights, Ohio, assignors to The Standard Oil Company, Cleveland, Ohio, a corporation of Ohio
No Drawing. Continuation-in-part of application Ser. No. 267,809, Mar. 25, 1963. This application Sept. 18, 1963, Ser. No. 309,856
Int. Cl. C07c *12/48, 121/02*
U.S. Cl. 260—464                                 4 Claims This application is a continuation-in-part of our application, Ser. No. 267,809, filed Mar. 25, 1963.

This invention relates to a process of chlorinating cyclobutane-1,2-dicyanide and to the products produced thereby. The reaction of chlorine upon the cyclobutane-1,2-dicyanide proceeds as follows:

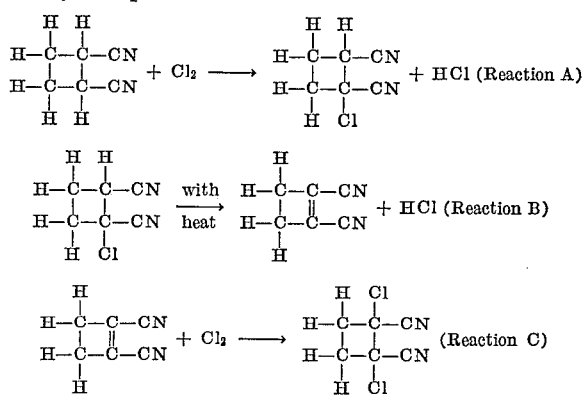

The compounds of the invention have the following formulas:

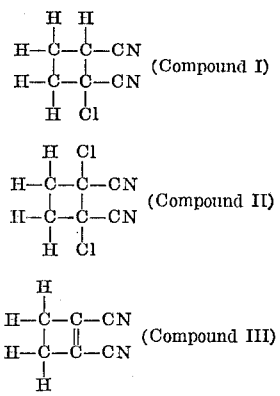

Either the cis or trans forms of the cyclobutane-1,2-dicyanide may be used as the starting material. The trans cyclobutane-1,2-dicyanide is the more readily available starting material and this form will be described in the preferred embodiment hereinafter. With either form as the starting material, there may be some tendency for isomerization from one form to the other during the reaction. From the above considerations it will be obvious that the Compounds I and II can exist in either the cis or trans forms but that Compound III can exist in only one form.

The reaction may be carried out in a solvent, if desired, but this is not essential. The reaction can be carried out in the presence of light but this is also not necessary. While hydrogen chloride is given off during the reaction, as will be seen from the above equations and will saturate any solvent employed during the course of the reaction, it is preferred to add hydrogen chloride. This increases yields apparently due to a catalytic effect.

Any inert solvent may be employed, if one is used, i.e., a solvent that does not react with the reaction components or the reaction products or one which independently becomes chlorinated during the reaction so as to be otherwise inert. A chlorinated hydrocarbon, a partly chlorinated hydrocarbon, or a hydrocarbon which becomes chlorinated to yield a chlorinated inert solvent during the reaction may be employed. Carbon tetrachloride is preferred. Other solvents which can be used include tetrachlorethylene and trichlorethylene.

The relative proportions of the dicyanide and solvent, if one is employed, are not critical but it is preferred that the cyclobutane-1,2-dicyanide be sufficiently large in relation to the solvent to maintain a single phase during the reaction mixture. The cyclobutane-1,2-dicyanide appears to dissolve some solvents. For instance, carbon tetrachloride is dissolved because at a concentration of 11% by weight of the dicyanide in carbon tetrachloride two phases are formed, whereas a single phase is produced when the dimer is present in a concentration of about 55% by weight at reaction temperature. Since the reaction takes place at a slower rate when two phases are present, a concentration of at least 55% by weight dicyanide in the solvent is preferred and an optimum of the dicyanide in carbon tetrachloride is about 60 to 80% by weight.

The reaction time is a function of temperature and the product or product distribution desired. Generally long reaction times are required to assure optimum yields at a given temperature. The product distribution is a function of the equilibrium between the variable compounds at a given temperature.

The reaction temperature may be from ambient temperature up to and including those at which dehydrochlorination (Reaction B) occurs, i.e., up to 300° C. and preferably from 60 to 200° C. If the reaction is carried out under reflux conditions the boiling points of the various materials in the reaction mixture can be utilized as a means of controlling the temperature. The reaction is exothermic and the rate of chlorine addition, as well as external cooling, can be used to control the temperature. The lower temperature limit is the boiling point of the solvent, if one is employed, when the reaction is carried out under reflux and when the solvent is carbon tetrachloride, this temperature is 77° C. However, the reflux temperature increases as the concentration of the dicyanide in the reaction mixture increases.

The relative proportions of Compounds I, II and III depend largely upon the reaction conditions, especially the amount of chlorine and the temperature. Compound I is formed when the amount of chlorine is less than the stoichiometric amount required and the temperature is relatively low. Optimum temperatures for Compound I are below 50° C. Under these conditions, the reaction mixture will consist of Compound I and the dicyanide starting material and they can be separated.

Compound III is favored at higher temperatures and with no excess of chlorine.

A mixture of Compounds I and III will be formed without an excess of chlorine and under moderate temperature conditions.

Compound II is formed with longer reaction times, lower temperatures and with an excess of chlorine.

A mixture of Compounds II and III will be formed with excess chlorine, shorter reaction times and higher temperature conditions.

Conditions which give an optimum amount of Compound II will not yield enough Compound I to justify isolating it. Conditions which give the optimum amount of Compound I will not yield enough of Compound II to justify isolating it.

The reaction conditions will be selected depending upon the compounds wanted. If all three compounds are separately wanted, a compromise in the reaction conditions will be selected and the products then separated.

The following example will illustrate the best mode contemplated for carrying out the process and for preparing the new compound.

EXAMPLE I

One hundred (100) grams of trans cyclobutane-1,2-dicyanide and fifty (50) grams of dry carbon tetrachloride were placed in a dry 250 ml. three-necked flask equipped with a thermometer, a gas bubbler, and a reflux condenser topped with a drying tube. Dry hydrogen chloride was bubbled in for four hours to saturate the solution. The dry hydrogen chloride feed was discontinued and dry chlorine was bubbled into the reaction mixture at room temperature while the flask was irradiated with ultraviolet light. The reaction mixture was gradually heated and as the reaction proceeded the temperature rose to a maximum of 172° C. during the course of seven hours. When the development of heat ceased, indicating that the reaction was complete, the carbon tetrachloride was evaporated from the reaction mixture and the residue fractionated by vacuum distillation. A yield of 75 grams of Compound II was obtained equivalent to a 52% yield based on the starting dicyanide. Amounts of Compounds I and III were not sufficient to isolate because of the large excess of chlorine.

EXAMPLE II

Example I was repeated except that the reaction time was maintained within the range of 30 to 82° C. during a period of 24 hours. A yield of Compound III was ½% and the yield of Compound II was 77% based on the dicyanide starting material. The lower temperature did not result in Reaction C going all the way to completion.

EXAMPLE III

Three mols of trans-cyclobutane-1,2-dicyanide, without any solvent, was continuously circulated through a heated reaction zone at a rate of 6 liters per hour during which time the temperature was maintained at 120 to 130° C. Into this circulating reaction mixture there was continuously fed a mixture of chlorine and hydrogen chloride, the amount of chlorine fed being 2 mols per hour and the amount of hydrogen chloride fed being ½ mole per hour. Any excess of chlorine and hydrogen chloride was vented from the reaction zone which was maintained at atmospheric pressure. The reaction mixture was sampled at each hour and the products therein determined by analysis. At the end of four hours there was 45 mol percent of Compound II and 15 mol percent of Compound III. A reaction time of 6 hours seemed to be the optimum for the formation of both Compounds II and III. At this time it was found that yield of Compound II was 65% and the yield of Compound III remained at 15%. After continuing the reaction for 9 hours, the yield of Compound II had leveled out to 66% and the amount of Compound III had dropped off to 10%. Thus Reaction B stopped substantially after 6 hours, but Reaction C continued.

EXAMPLE IV

Example III was repeated except that the temperature was maintained at 45° C. over a period of 3 hours. A total of only 2.5 mols of chlorine in admixture with ½ mol of hydrogen chloride was uniformly introduced over the six hours. Compound I was produced in a yield of 38%.

The structure of all of the three compounds was confirmed by carbon, hydrogen and nitrogen analysis and infrared spectra and by nuclear magnetic resonance spectra.

Compound I is a colorless viscous liquid having a boiling point of 120° C. at a mercury pressure of 6 mm.

Compound II has a melting point of 65.5 to 66.5° C. and a boiling point of 104° C. at a mercury pressure of 6 mm.

Compound III is a clear, viscous liquid having a boiling point of 57° C. at a pressure of 1 millimeter of mercury.

All of the products are useful as a nematocide and can be applied to a nematode containing soil in any of the usual manners such as in a solvent or mixed with a solid carrier such as clay, or as an ingredient of a fertilizer. The presence of the cyanide adjacent to a chloride group or a double bond results in activation of the cyanide group and makes the compounds particularly effective for this purpose. Compounds I and II may be applied at the rate of 40 to 60 pounds per acre, and Compound III at the rate of 1 to 20 pounds per acre, in accordance with any of the well-known techniques for applying nematocides.

We claim:

1. A compound having the formula:

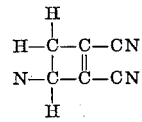

2. The method for preparing the compound having the formula

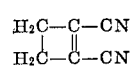

which comprises heating the compound having the formula

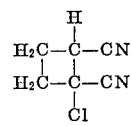

at a temperature from 60 to 200° C.

3. The method for preparing the compound having the formula

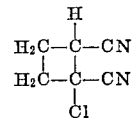

which comprises chlorinating one mole of cyclobutane-1,2-dicyanide with one mole of molecular chlorine in the presence of added hydrogen chloride at a temperature below 50° C.

4. The method for preparing the trans form of the compound having the formula

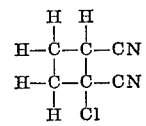

which comprises chlorinating one mole of trans cyclobutane-1,2-dicyanide with about one mole of chlorine in the presence of hydrogen chloride at a temperature of about 50° C., said preparation being carried out in the presence of light.

References Cited

Groggins: "Unit Processes in Organic Synthesis," 3rd ed., 1947, p. 169. QD–262–G7–1947.

Knapsack, C. A.: 55, 1961, p. 13338. QD–1–A51.

Lustig: J. Chem. Physics, 37, Dec. 1, 1962, pp. 2725–2726. QD–1–J83.

JOSEPH P. BRUST, *Primary Examiner.*

U.S. Cl. X.R.

204—158; 424—304